Sept. 24, 1957 E. J. RABENDA 2,807,419

PRE-SET RECYCLING GLOW TRANSFER COUNTER

Filed May 17, 1954 2 Sheets-Sheet 1

*INVENTOR.*
EDWARD J. RABENDA
*BY* William V. Schellberg
AGENT

Sept. 24, 1957 E. J. RABENDA 2,807,419

PRE-SET RECYCLING GLOW TRANSFER COUNTER

Filed May 17, 1954 2 Sheets-Sheet 2

INVENTOR.
EDWARD J. RABENDA

BY William V. Schelberg
AGENT

United States Patent Office 2,807,419
Patented Sept. 24, 1957

2,807,419

PRE-SET RECYCLING GLOW TRANSFER COUNTER

Edward J. Rabenda, Poughkeepsie, N. Y., assignor to International Business Machines Corporation, New York, N. Y., a corporation of New York Application May 17, 1954, Serial No. 432,660
6 Claims. (Cl. 235—132)

The present invention relates to counter systems of the type used for timing, control of mechanical functions and like operations wherein detection of the accumulation of any predetermined number of counts is required. These systems generally employ plural orders of counter devices arranged as a succession of cascaded stages operating in accordance with the decimal system and provide an output upon receipt of a predetermined number of representations to be counted, so as to control other apparatus and simultaneously recycle itself in preparation for receipt of a following series of count indications.

In such systems, the units order counter is stepped directly under control of the count pulses while the higher orders are stepped only by a carry signal from a successive lower order when the latter advances from the nine to the zero position, however, in order to sense a predetermined plural order number correctly, operation of a predetermining stage under control of a lower order counter stage is withheld until the preceding stage has detected the desired digit in its related order and, when all the stages have operated, a work circuit is completed. Known systems of this type require provision of special apparatus to insure correct operation when one of the orders of the number contains a zero, through the insertion of artificial zero digit signals to any stage which has been set to sense the digit zero. In other systems, the complement of the predetermined count number is inserted in the counters by a series of manually operated decimally related switches which may be calibrated directly in terms of the desired number, however, auxiliary pulses are required to preset the counters to the nine's complement of the number with an artificial extra count of one added to the counters to insert the true complement count.

It is a principal object of the present invention to provide an improved determined counter of simple construction and employing cold cathode glow transfer decade counter tubes.

The invention also has as an object the provision of a counter circuit, the successive stages of which comprise glow transfer counter tubes and whereby a control pulse is provided during the cycle in which a predetermined count has been attained as determined by settable means.

In accordance with the invention, the settable means comprises manually operable control switches calibrated for the desired predetermined count with the number of such switches and associated glow transfer counter tubes provided as desired for the capacity of the system. The control switches are set at the count number with the glow counter tubes of the several orders set and reset directly to respective 9's and 10's complement positions by the switch settings and without the need of auxiliary apparatus for insertion of artificial ones or zero pulses. A particularly important feature of the invention resides in the simplicity with which such resetting is accomplished as well as the lesser amount of equipment needed for reliable operation.

Other objects of the invention will be pointed out in the following description and claims and illustrated in the accompanying drawings, which disclose, by way of example, the principle of the invention and the best mode, which has been contemplated, of applying that principle.

In the drawings:

Figures 1 and 2 taken together are a schematic circuit diagram of a preset counter showing four representative orders of glow transfer counter tubes.

Figures 1, 3:
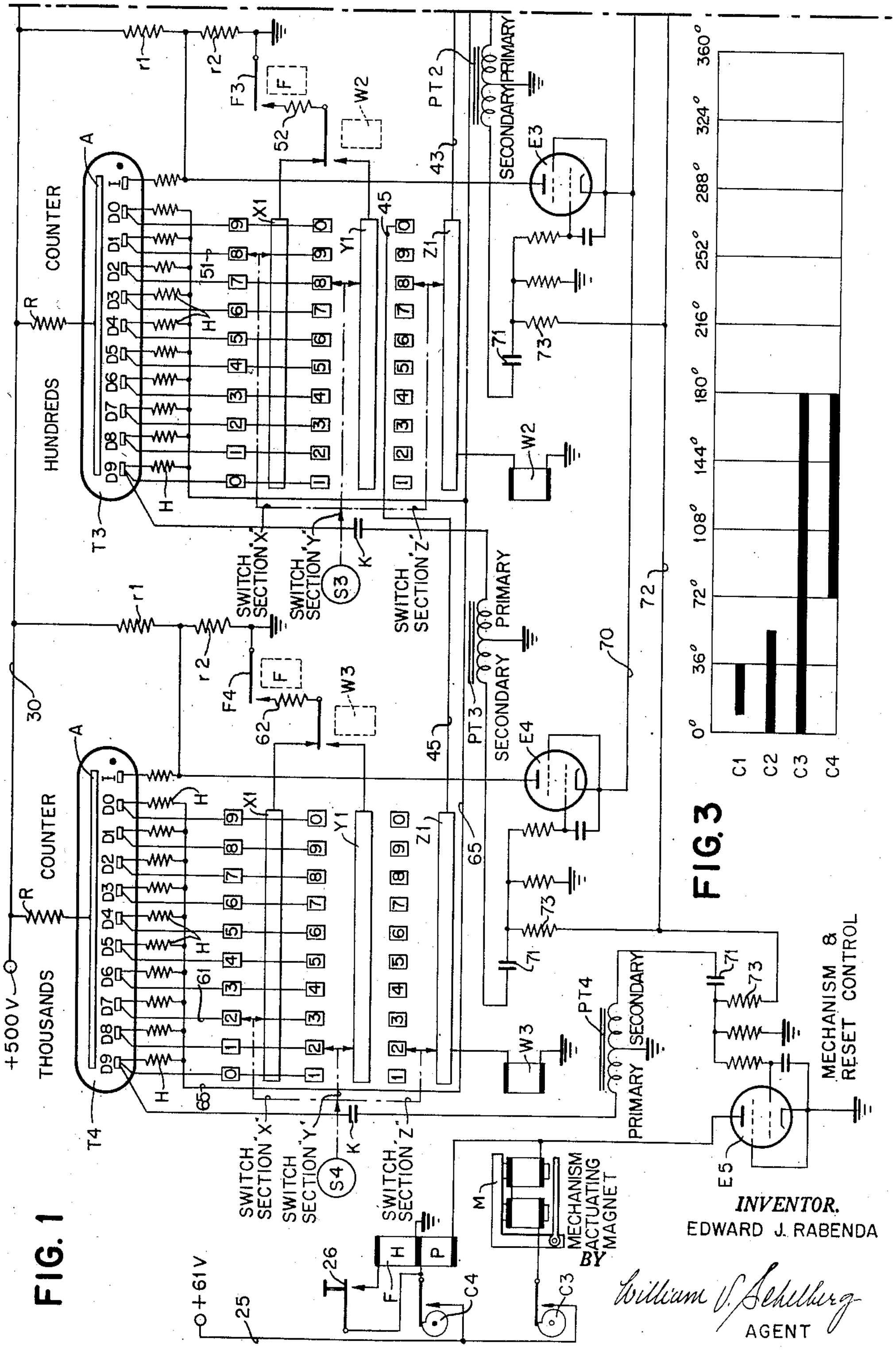
Figure 3 is a timing chart illustrating the periods of closure of the several cam operated contacts employed in the circuit of Figures 1 and 2.

The present counter circuit to be described may be used to produce an output signal or activate a work circuit in response to pulses derived from plural sources and representative of ordered information from the several sources, however, that shown is responsive to signals from a single source and may be operated at speeds in excess of one thousand counts per minute when employed, for example, in establishing a count of the output of a card printing press to separate the printed cards into groups containing a predetermined number.

Referring now to the drawings, a glow transfer counter tube T is provided for each order and comprises an envelope within which are positioned a single anode electrode A and a plurality of cathode elements to which numerical designations D–0 through D–9 and I are given. The counter tubes T are similar to that shown in Patent No. 2,621,313, issued December 9, 1952, to R. K. Steinberg, wherein ten digit representing cathodes are arranged in a closed glow transfer path with the intermediate cathodes I interspersed between each of the digit cathodes and with the anode spaced equidistantly from all of the cathodes. Operation of such a counter tube is described in detail in the above mentioned patent and need be only briefly related here for an understanding of the present invention as the structure is modified only in that individual output connections are made to the several digit cathodes. With the tube structure outlined above, the single cathode I illustrated in the drawing represents ten interspersed similar I cathodes connected to the same circuit externally of the tube. Each cathode is composed of a plurality of materials of different surface characteristics and is so formed or arranged that a region of preferential glow transfer is established between each cathode and one other cathode. The digit cathodes D are connected to a common voltage source through individual resistors H, and the transfer cathodes I are connected together, with a voltage pulse applied to the commonly connected intermediate cathodes I, in response to each count pulse, to advance the glow discharge to successive ones of the digit cathodes D. With a glow initially set at the zero digit cathode D–0, for example, only one glow discharge will exist within the tube due to the magnitude of an anode resistor R and the increased voltage drop thereacross produced by a discharge to more than one cathode position.

As a result of a count pulse, the voltage on the intermediate cathodes I is lowered and, due to the preference mechanism provided, the glow will transfer in only one direction to one of the adjacent transfer cathodes I. As the pulse is relaxed, the glow again transfers in one direction only and exists between the anode and the next digit cathode position D–1, representing a one. Each count pulse advances the glow in like manner to the next adjacent digit cathode representing a higher numerical value. As a glow discharge leaves the 9 digit representing cathode D–9, the downward voltage swing developed thereon is used to indicate that ten counts have been applied to the tube, however, an output may be taken from any one of the D cathodes and a decimal indication may also be obtained from the upward voltage swing on the D–0 cathode as a glow transfers thereto, as a further example. In the circuit arrangement illustrated, the indication of a decimal count is taken from the 9 digit representing cathode, however, the system is not to be considered limited to such a specific arrangement as other output arrangements are obvious, as above mentioned, as well as a radix other than ten.

Each of the counter tubes T1 to T4 is provided with an associated thyratron E, to which corresponding subscripts are applied, and by which means the potential on the transfer cathodes I is varied to effect a count in that counter order. Signals to be counted are applied to the grid of thyratron E1 of the units order counter and cause the glow counter tube T1 to advance one position for each applied count pulse. Upon application of a pulse transferring the glow discharge to the cathode D–9 (the ninth pulse if initially set at D–0) the voltage thereon swings upward to a value of approximately +210 volts and a positive pulse is applied, via a condenser K, to the primary winding of a pulse transformer PT1, and thence to ground. The secondary winding is differentially connected so that the output pulse developed is negative and ineffective to fire the associated thyratron tube E2, provided for the tens position counter state. Upon application of a succeeding pulse transferring the glow discharge from the D–9 cathode, the voltage thereon drops from +210 to +135 volts and a negative pulse is applied via condenser K to the primary winding of the pulse transformer PT1. The differentially connected transformer has a 4 to 1 turns ratio and an amplified pulse of positive polarity is developed in the secondary for application to the grid of thyratron E2. The counter tube T2 then accumulates a one on every tenth count applied to the units order counter. In a similar manner the tens order counter is coupled to advance the hundreds order counter T3 and the latter to advance the thousands order counter T4, etc., with a sufficient number of orders provided to accommodate the magnitude of the desired predetermined count.

As the terminal or *n*th order is advanced through its tens position, or when the glow discharge is advanced from the D–9 cathode in the illustrated thousands order counter tube T4, the downward voltage swing developed thereon is applied as a voltage pulse to the primary of transformer PT4 and the positive secondary voltage developed fires a mechanism actuating and reset control thyratron tube E5. Conduction in this tube completes a circuit from a lead 25, held at +61 volts potential by a source not shown, through a paralleled circuit including a cam operated contact C4 and the pick coil of a reset magnet F, and a cam contact C3 and a mechanism actuating magnet M. Operation of these elements respectively recycle the counter unit for a second series of input count pulses and perform the control function desired upon entry of a predetermined number of count pulses.

Figures 2, 4:
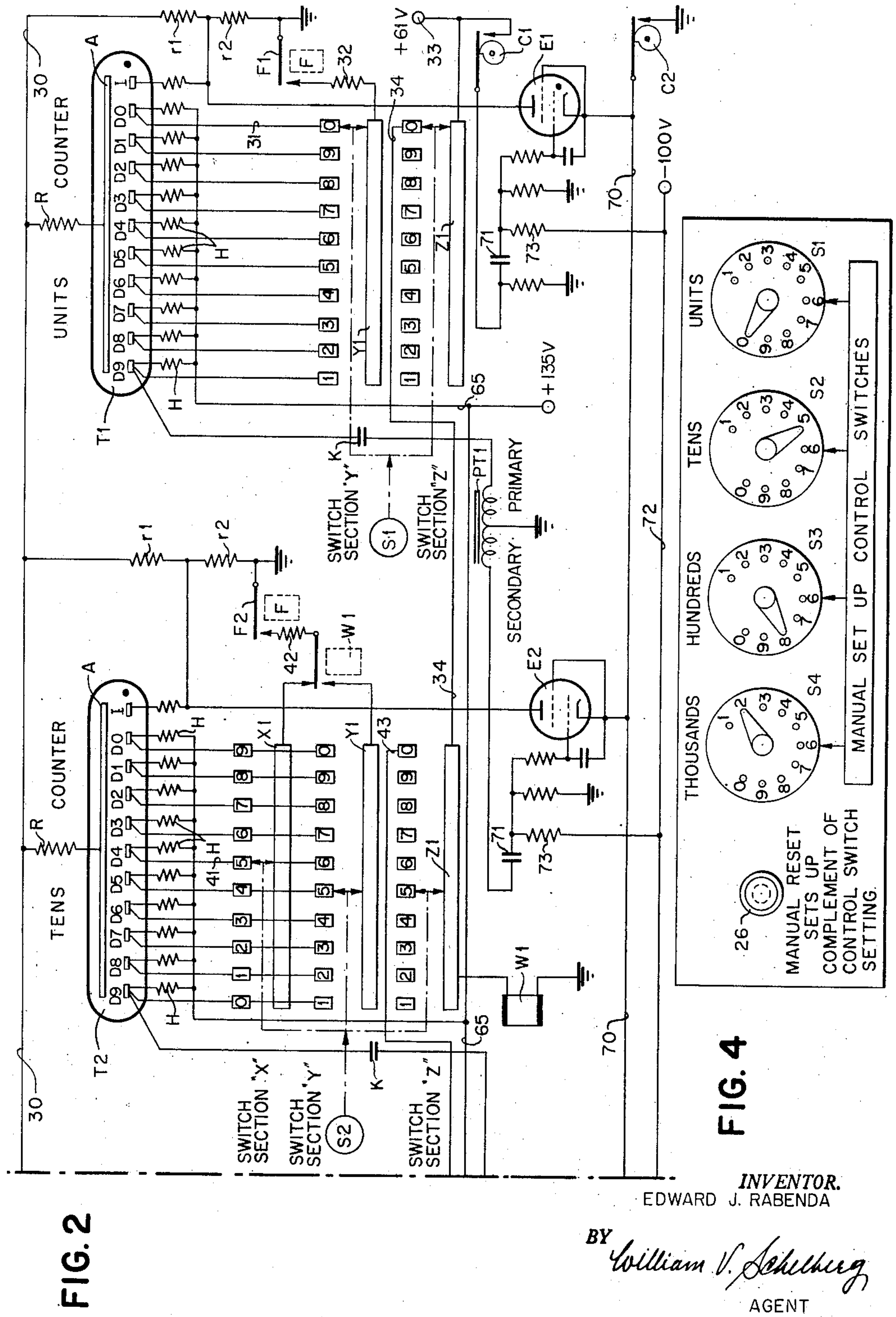
Figure 4 is a diagram of the manually operable switches provided for setting the predetermined count and which are operable on contacts shown in the circuit diagram.

The first step in the operation of the predetermined counter system is the setting of manual control switches S shown in Figure 4. As seen in this view, one control switch indicator is provided for each order of the counter which, as before mentioned, may be of any selected magnitude and is set for a value of 2850, for example, corresponding to the direct value of a desired predetermined count. Each switch S has three sections labeled X, Y and Z associated with the corresponding order counter tube, as seen in Figures 1 and 2. Each section X represents the nine's complement of the value set up in that order and connects with the digit cathode representing that complement value through one of a set of individual contacts labeled with the nine's complement values, and a contact strip X1. Section X of the switch S–1 is not used since the units position counter T1 is always reset to the tens complement of the digit value glowing in the counter tube and serves no useful purpose in this order. Each switch section Y represents the tens complement of the predetermined count and corresponding counter tube digit cathodes are connected to a second set of individual contacts labeled with the tens complement values, with one connected to a contact strip Y1 in accordance with the switch setting. Section Z of each of the switches S utilizes only the "0" contact to control the tens complement reset in the next higher order position, with this section not being used in the thousands position as there is no higher order position to be controlled with the number of orders illustrated. It is to be noted that in each of the switches S, section X is physically offset one position to the right of sections Y and Z and that section X is consequently always connected to a digit cathode of the counter tube T which is one less in value than that connected to the switch section Y.

Having manipulated the switch controls as shown in Figure 4 to the selected value and thereby caused the contacts shown in Figures 1 and 2 to be positioned as described, the second step is accomplished by depression of a reset key 26 shown as a push button at the left of the panel in Figure 4 and schematically in Figure 1 at the extreme left of the drawing. The reset key 26 is held closed and a circuit is completed from the +61 volt line 25 through the contacts C4 and the hold coil of relay F to ground. The contacts C4 are driven in synchronism with a card feed mechanism (not shown) in application of the counter to card printing apparatus, as previously mentioned, and are closed for the period indicated by the heavy lines in the timing chart shown as Figure 3. In this chart, one complete cycle of operation is represented by 360° in time and it is seen that the contacts C4 are closed from 72 to 180 degrees of this interval. Energization of the relay F effects closure of contacts F1, F2, F3 and F4 respectively, associated with a corresponding one of the illustrated counter tubes T. At the units position counter T–1, closure of the contact F1 completes a circuit from a +500 volt line 30 through the anode resistor R, the anode A, digit cathode D–0, lead 31 to the "0" contact of section Y of the manual control switch S–1, through the switch section connection to the contact strip Y1, a 1K ohm resistor 32 and the contact F–1 to ground. The potentials thus applied to the anode and the D–0 cathode are such that a glow discharge is initiated therebetween setting the counter tube T1 to the tens complement of the value set in the units order switch S–1.

As previously mentioned, the tens complement will always be entered in the units position while the nines complement will be entered in the other order positions, unless a zero appears in a succeeding lower order position. Under this condition the tens complement will be entered. In the example taken for illustration, the units position is a "0" so that the tens order position counter T2 is set up to a tens complement value rather than a nines complement value. Switch section Z of the units order switch S1 is set in contact with the "0" contact and a contact strip Z1 completes a circuit from a terminal 33, held at +61 volts by a source not shown. The "0" contact is connected to a lead 34 and through the contact strip Z1 of section Z of switch S2 to a relay coil W1. This relay is energized and through operation of its contact transfers a circuit normally made to the 9's complement contact strip X–1 to the tens complement contact strip Y1 of the tens order counter switch S2. A circuit is now completed for the tube T2 from the 500 volt line 30, resistor R, the anode A, the D–5 cathode, lead 41, the "4" contact on section X of switch S2, the "5" contact on section Y, connector strip Y1, normally open now closed contacts of relay W1, a resistor 42 and contact F2 to ground. Under this condition the D5 cathode of tube T2 will glow and the tens complement of the preselected number in this order is set up. If a significant digit had been set up in the units position, the tens position circuit described would have been completed through the normally closed contacts of relay W1 with the result that the glow would have been established at the D4 cathode, and representing the nines complement. This is the condition existing for the hundreds order counter tube T3 as the tens order does not contain a zero and a circuit 43 is held open keeping relay W2 deenergized. For this counter tube a circuit is completed from line 30 through the anode resistor R, the anode A, digit cathode D–1, lead 51 to the contact "8" of section X of switch S–3, contact strip X1, the normally closed contacts of the relay W2, a resistor 52 and the closed contacts F3 of relay F, to ground. This circuit applies a voltage between the anode and digit cathode D–1 so that a glow discharge is initiated therebetween and the nine's complement of the number 8 set up in the control switch S3 is established in the hundreds order counter tube T3.

Since the Z section of switch S2 is on a contact other than "0," the lead 45 and relay W3 remain deenergized and the contact operated thereby and associated with the thousands order counter remain in a normally closed position setting up the glow discharge at the nine's complement of the digit 2 set up by switch S4. The circuit path for this condition is from the line 30, anode resistor R of tube, T4, the anode, digit cathode D7, lead 61, X section contact "2" of switch S3, contact strip X–1, normally closed contact of the relay W3, resistor 62 and contact F4 of relay F to ground.

Each of the digit cathodes D–0 through D–9 are connected through individual resistors H to a bus 65 which is maintained at a potential of +135 volts. After the reset key 26 is released, the contacts F1 to F4 of relay F open and the glow discharge in each of the tubes T is maintained on the cathodes to which it was established but through a circuit including the aforementioned resistors H and the +135 volt bus 65.

Now that the reset key 26 has been operated and the complement value of the count entered in the counter tubes, the actual counting operation may proceed. As previously mentioned, each glow counter tube T is advanced by means of a counter driver tube E. The cathodes of each of the latter are commonly connected through a lead 70 and cam contact C2 to ground. The plate of each driver tube is connected to the intermediate cathode I of its associated counter tube, and to the junction of a pair of resistors $r1$ and $r2$ connected between the line 30 and ground. The control grid of the units position driver tube E1 is connected to the +61 volt terminal 33 through a condenser 71 and cam operated contact C1 while the control grid of the tens, hundreds and thousands orders tubes E–2, E–3 and E–4 are connected through a similarly labeled condenser 71 and their associated pulse transformers PT to the D–9 cathode of the next lower order counter tube T. As seen in the figure, a negative grid bias is obtained by connection of the grid circuits to a −100 volt line 72 through a resistor 73, with a conventional resistor-capacitor grid coupling circuit being provided for each tube E. The D–9 cathode of the highest order tube T is connected to the grid of a driver tube E5 which, instead of driving the intermediate cathodes I of a higher order, serve as a mechanism and reset control tube as mentioned heretofore. The cathode of the tube E5 is grounded and the plate connected through actuating magnet M and cam contact C3, in parallel with the pick coil of the reset relay F and contacts C4, to the +61 volt line 25. As soon as the mechanism controlling the feeding of items to be counted is begun, the C cams and contacts are operated. Each time the contact C1 closes, as in each cycle of operation counted, the +61 volts is applied through the coupling condenser 71 to the grid of the counter driver tube E1 and triggers this tube until the contact C2 opens the cathode circuit to ground at a time as indicated in Figure 3. While the tube E1 is conductive, the voltage normally applied to the intermediate cathodes I of counter tube T1 through the resistor divider $r1$ and $r2$ is lowered and the glow standing at the D–0 cathode is advanced to the next adjacent I cathode. As the cam C2 opens the cathode circuit of tube E1, the potential of the I cathodes returns to a normally higher level and the glow transfers to the digit cathode next associated in the preferred direction through the current path including the resistors H and +135 volt line 65. Each time the cam contacts C1 and C2 are operated the units counter glow discharge is advanced one position and, since initially set at the D–0 cathode, each tenth count will cause the glow to advance from the D–9 cathode to the D–0 cathode in tube T–1. As the glow leaves the D–9 cathode, the voltage thereon decreases from approximately +210 volts to approximately +135 volts and a pulse is directed through the condenser K to the primary winding of the pulse transformer PT1 and to ground. Due to the 4 to 1 turns ratio of the differentially connected transformer, a positive pulse of sufficient magnitude is applied to the grid of the tube E–2, overcoming the −100 volt bias and causing conduction. The intermediate cathodes I of counter tube T2 are lowered in potential momentarily and the discharge at the D5 cathode advances to the adjacent I cathode in the preferred direction, then, as the potential of the I cathode is returned to normal when the cathode circuit of E2 is opened by operation of contact C2, transfers to the D–6 cathode. This action occurs on every tenth count after the first transfer from the D–9 to the D0 cathode in the counter T2. The number of counts necessary to effect the first transfer from D–9 to D–0 in the counter T2 is dependent on the starting point. Similarly with the other orders, the succeeding higher orders are advanced on each tenth pulse applied to the lower order except for the first advance which depends upon the starting point set up. At the end of 49 counts, the unit will read 7199 for the example taken. The next count will cause the units position counter glow position to transfer from D–9 to D–0 triggering the tens order counter drive tube E2 and transferring the glow standing at D–9 in counter T2 to the D–0 digit cathode. This causes the driver E3 to conduct and advance the glow position in the counter T3 from the D–1 cathode to the D–2 cathode. After 2849 counts have been accumulated and unit will read 999 and the 2850th count effects a D–9 to D–0 transfer for the units, tens, hundreds and thousands order tubes with the voltage swing developed on the D–9 cathode of tube T4 applied through the condenser K and transformer PT–4 to the grid of control tube E5. Since the contact C3 is closed at this time, a circuit is completed from the +61 volt line 25 through the actuating magnet M to ground and the desired function is accomplished thereby. As mentioned heretofore the exact nature of the function performed by magnet M depends upon the application of the device. As seen from the timing chart (Fig. 3) the contact C4 closes shortly after C3 and the pick up coil of relay F is energized through the tube E5 to effect an automatic resetting of the glow positions in the tubes T1 to T4 to that originally provided through closure of the manual reset switch 26. Thus, once the counter switches S have been set and the manual switch 26 depressed, the counting operation continues automatically without further attention.

Numerous uses of the system described herein are possible and it is obvious that the cam operated control illustrated may be replaced by other well known circuit making devices and/or pulse producing means.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A self-cycling predetermined counter system comprising a plurality of cascade connected denominational counters, each providing stable counting states in accordance with the decimal system, an input circuit coupled to the lowest denominational counter, a source of electrical impulses representative of counts to be accumulated coupled to said input circuit, a manual set up control switch for each of said counters each having selectable count presetting positions in accordance with the decimal system and including means for establishing an initial count in said counters as the complement of the settings with the initial count in the lowest order being the tens complement and in each of the succeeding orders the nines complement unless a zero is entered in a lower order whereupon the tens complement is established in the next one of said succeeding orders.

2. In combination with a source of varying potential, a self-cycling electronic predetermined counter system having a plurality of stable states successively induced by successive variations of the potential of said source, said counter system comprising a plurality of cascade-connected denominational orders of counters each having N stable counting states, an input circuit for the lowest order denomination counter and connected to said potential source, a manual set up control switch for each said counter, said switches having N selectable counter presetting positions for selectively presetting its counter to one of said stable states with the lowest order counter set to a state representative of the N complement of the selected order digit and each of the succeeding orders set to a state representative of the (N−1) complement of the selected order digit unless a zero is set in a lower order whereupon the N's complement is established in the next one of said succeeding orders.

3. A predetermining system for sensing the advance of a counter to a predetermined number, said counter comprising a plurality of denominational orders of which the higher orders are advanced by carry signals from the preceding order, said system comprising a series of circuit stages each including glow transfer counter tubes having an input circuit connected to the output circuit of a successively lower order counter tube to receive signals therefrom representing a predetermined number, means for impressing signals representative of a count to be accumulated to the input circuit of the lower of said orders, means for establishing an initial count in said glow transfer tubes comprising the complement of the predetermined number with the initial count in the lowest order being the tens complement and in each of the succeeding orders the nines complement unless a zero is entered in a lower order whereupon the tens complement is established in the next one of said succeeding orders, and means for producing an output control impulse upon reaching the capacity of said plurality of denominational orders.

4. A predetermined counter system comprising a plural order counter device adapted to sense the accumulation of a predetermined number registration, each said order including a cold cathode glow transfer decimal counter tube advanced by carry impulses from the preceding lower ordered counter tube and with impulses representative of the predetermined order applied to the lowest order, a manual set up control switch means for each of said counter tubes having selectable count presetting positions and including means for initially establishing a glow position in said counter representing the complement value of the setting with the initial glow position in the lowest counter being representative of the tens complement of the setting and that in succeeding orders representing the nines complement of the setting in the associated order unless the lower order is set at a zero position whereupon the glow is established at a position representative of the tens complement of the setting in the next one of said succeeding orders.

5. A self-cycling predetermined counter system comprising a plurality of cascade connected denominational counters each providing stable counting states in accordance with the decimal system and in which the higher orders are advanced by carry signals from the preceding order and the lowest order advanced by signals representing the count to be determined, said counters each comprising a cold cathode glow transfer tube having a single anode and a plurality of digit cathodes to which a glow discharge is established in representing a number, an intermediate cathode interspersed between each digit cathode and adapted to transfer a glow discharge in one direction therealong in response to electrical impulses applied thereto in common, circuit means coupled to the intermediate cathode of the lowest order glow counter tube and a source of signals to be counted, further circuit means coupling the highest order digit cathode of each said counter tube to the intermediate cathode circuit of the next succeeding order counter with the last said circuit means adapted to actuate an indicating device, means for initially establishing a glow discharge at a zero representing digit cathode in each said counter tube, means for thereafter establishing a glow discharge at the digit cathode representing the complement of the number to be determined, said latter means comprising a manual settable switch means for each denominational order whereby a glow representation of the tens complement of the number is established in the lowest order tube and a glow representation of the nines complement of the corresponding order of the number is established in succeeding higher orders unless a zero glow representation is established in a lower order whereupon a representation of the tens complement of that order number is established in the next one of said succeeding higher orders.

6. A predetermined counter system comprising a plurality of cascade coupled denominational counters each providing stable counting states in accordance with the decimal system and in which the higher orders are advanced by carry signals from the preceding order and the lowest order advanced by signals representing the count to be determined, said denominational counters each comprising a cold cathode counter tube having a single anode and a plurality of digit representing cathodes interspersed with a like plurality of commonly connected transfer cathodes, means for transferring a glow discharge from one digit cathode to a succeeding digit cathode comprising a thyratron driver tube coupled to said commonly connected transfer cathodes, circuit means coupled with a source of electrical pulses to be counted and adapted to fire the thyratron coupled with said lowest order counter tube and advance the glow discharge therein one digit position for each succeeding count pulse, circuit means coupling the ninth digit cathode of each of the lower order counter tubes to fire the thyratron driver tube of the next succeeding counter tube and advance that counter tube one position for each tenth count accumulated in the lower order tube, said latter circuit means including a coupling capacitor and a pulse transformer, means coupled to the ninth digit cathode of the highest order counter tube and adapted to actuate an indicating device on accumulation of the count to be determined, means for initially establishing a glow discharge at a digit cathode position representing the complement of the number to be determined and comprising a manual settable switch device for each denominational order counter whereby the tens complement of the number is established in the lowest order position and the nines complement of the corresponding order of the number is established in succeeding higher orders unless the glow discharge established in the next lower order represents a zero whereupon a representation of the tens complement of the number is established in the adjacent higher order position.

References Cited in the file of this patent

UNITED STATES PATENTS

| | | |
|---|---|---|
| 2,343,370 | Dickinson | Mar. 7, 1944 |
| 2,652,197 | Berger | Sept. 15, 1953 |
| 2,669,388 | Fox | Feb. 16, 1954 |